Patented Apr. 1, 1952

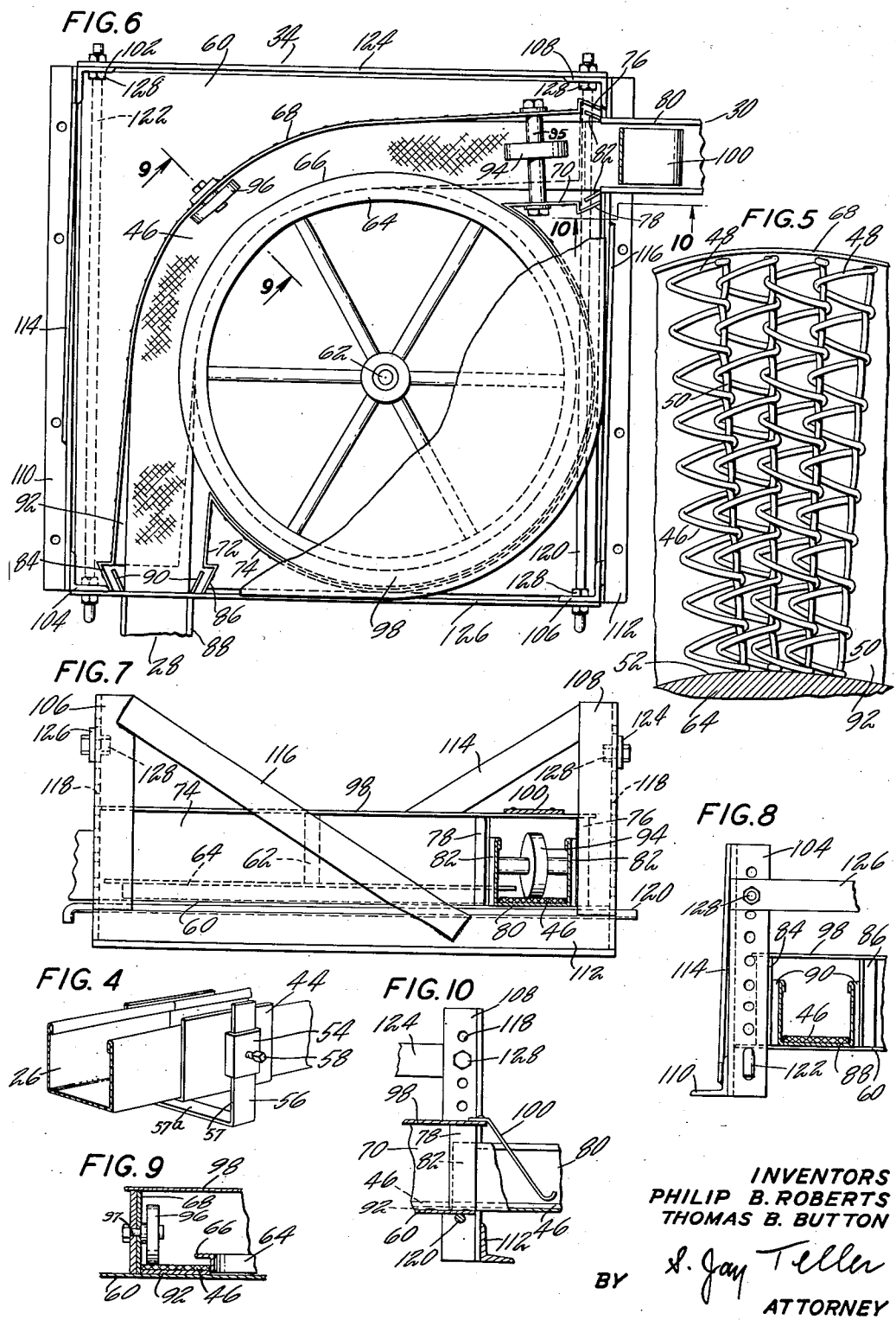

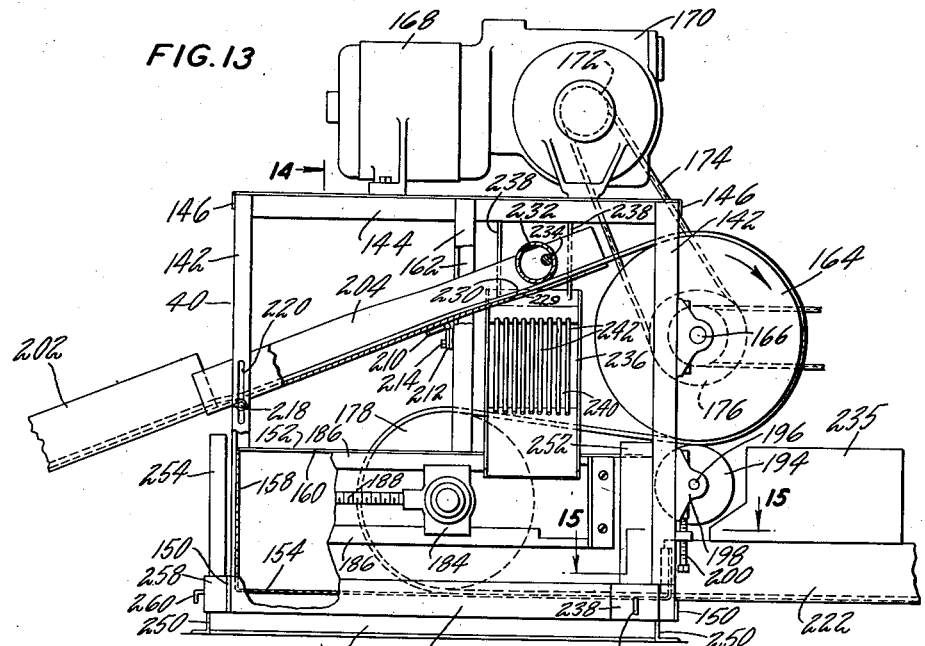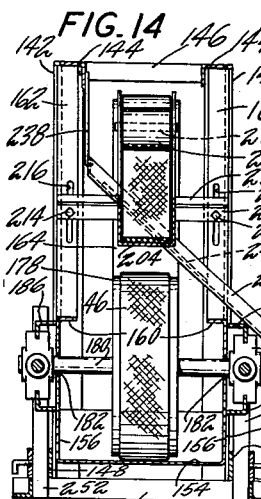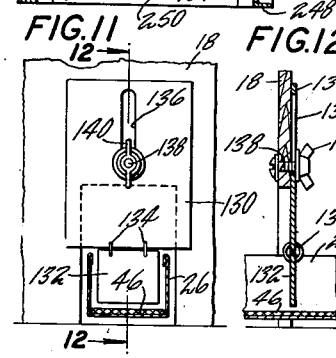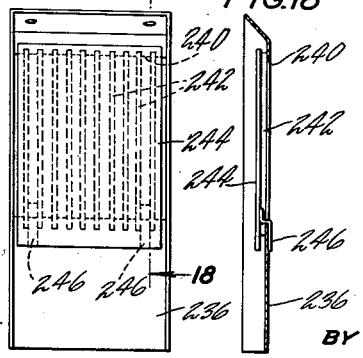
INVENTORS
PHILIP B. ROBERTS
THOMAS B. BUTTON
BY
ATTORNEY

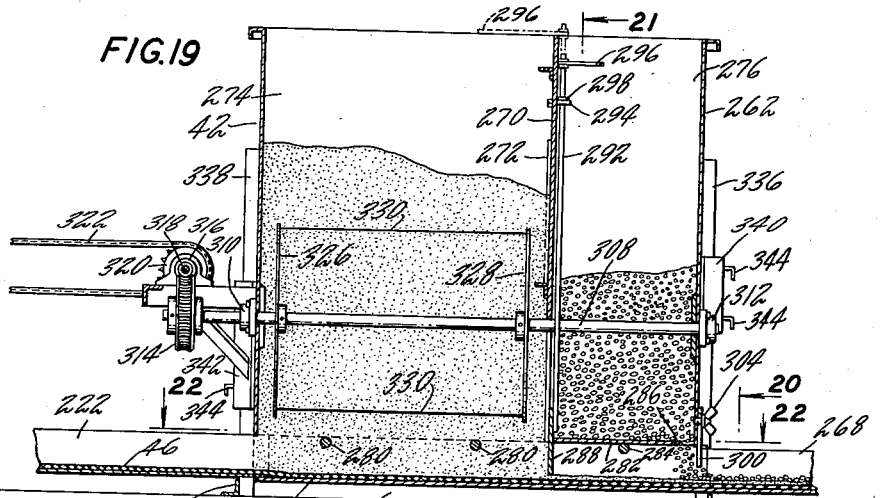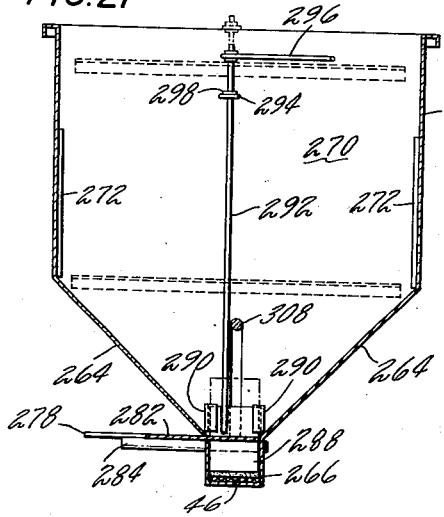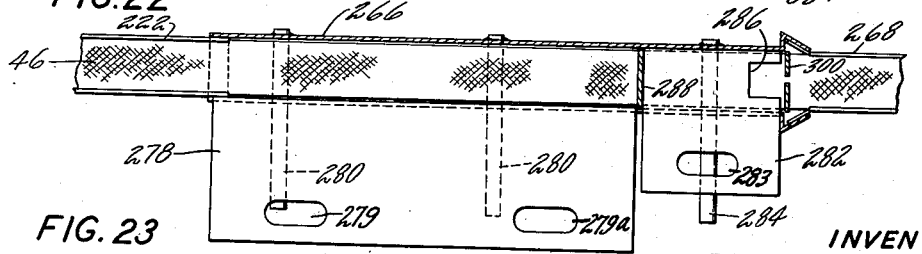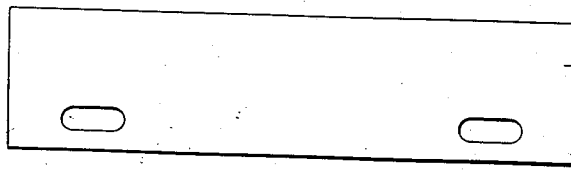

2,591,609

UNITED STATES PATENT OFFICE 2,591,609

POULTRY FEEDING APPARATUS

Philip B. Roberts and Thomas B. Button, Durham, Conn.

Application June 19, 1950, Serial No. 168,916

24 Claims. (Cl. 119—51)

The invention relates to a poultry feeding apparatus of the type wherein an endless chain moves feed from a feed supplying means into and along one or more feeding troughs so as to be available to poultry in suitable pens.

One of the objects of the invention is to provide means at a suitable position along the path of chain movement and beyond the feeding trough or troughs for enabling residual feed still engaged by the chain to be separated by gravity from the chain and then returned to another portion of the chain for movement thereby. Advantageously the residual feed separated from the chain and returned to another portion thereof may be carried by the last said portion of the chain into the feed supplying means where additional feed is supplied before the chain again moves into and along the feeding trough or troughs.

A further object of the invention is to provide means, which may be used when desired, for entirely separating the above mentioned residual feed from the chain so that it is not carried into the feed supplying means to be commingled with other feed.

A further object of the invention is to provide means for separating debris from the chain so that it cannot be carried thereby into the feed supplying means and recirculated along the feeding troughs.

A still further object of the invention is to provide a poultry feeding apparatus of the type specified having a transversely horizontal belt or chain having transversely extending interlaced wires which provide feed carrying interstices uniformly distributed over the plan area of the chain.

A chain as last above-described is flexible edgewise and a still further object of the invention is to provide means or devices for flexing the chain edgewise so as to change its direction of movement while it remains transversely horizontal.

A still further object of the invention is to provide a poultry feeding apparatus having improved means for driving a chain of the type above-described.

A still further object of the invention is to provide a poultry feeding apparatus of the type described having improved means for supplying feed to the chain.

Still other objects of the invention will be apparent from the drawings and from the following description and claims.

In the drawings we have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a schematic plan view showing a poultry house with a poultry feeding apparatus embodying the invention.

Fig. 2 is a plan view of the poultry feeding apparatus, the cover plates for two of the corner units being omitted.

Fig. 3 is a front view of the poultry feeding apparatus.

Fig. 4 is an enlarged perspective view showing a portion of one of the feeding troughs and showing one of the adjustable trough supporting means, the feed carrying chain being omitted.

Fig. 5 is an enlarged plan view of a portion of the feed carrying chain, this view showing the chain flexed edgewise.

Fig. 6 is an enlarged plan view of one of the corner units with a portion of the cover plate broken away.

Fig. 7 is a right side view of the corner unit shown in Fig. 6.

Fig. 8 is a fragmentary front view of the corner unit as shown in Fig. 6, the connected trough being shown in vertical section.

Fig. 9 is a fragmentary vertical sectional view taken along the line 9—9 of Fig. 6.

Fig. 10 is a fragmentary vertical sectional view taken along the line 10—10 of Fig. 6 with a portion of the trough broken and shown in vertical section.

Fig. 11 is an enlarged vertical view taken along the line 11—11 of Fig. 2 and showing a portion of one of the partitions of the poultry house and showing the parts at the position where one of the troughs extends through the partition.

Fig. 12 is a vertical sectional view taken along the line 12—12 of Fig. 11.

Fig. 13 is an enlarged front view of the chain drive unit and of immediately associated parts.

Fig. 14 is a transverse vertical sectional view taken along the line 14—14 of Fig. 13, the motor being omitted.

Fig. 15 is an enlarged fragmentary horizontal sectional view taken along the line 15—15 of Fig. 13.

Fig. 16 is a fragmentary vertical sectional view taken along the line 16—16 of Fig. 15.

Fig. 17 is a detail view of the deflector device associated with the drive unit.

guide the transversely horizontal chain in a lateral path from the forward end of the trough 26 to the rearward end of the trough 28. The units 36 and 38 serve to flex the chain edgewise and the said units in cooperation with other parts to be described serve to guide the transversely horizontal chain in a lateral path from the forward end of the trough 28 to the rearward end of the trough 26.

The corner guide units 32, 34, 36 and 38 may be varied as to details of construction, but the said four units are preferably identical in construction, except for additional parts provided for the unit 36. The unit 34 is shown in Figs. 6 to 10 and will be described in detail.

Each corner unit comprises a main horizontal supporting plate 60 which is shown as square. Suitably secured to the plate 60 and projecting upwardly therefrom is a vertical bearing stud 62. Rotatably mounted on the stud 62 is a wheel 64 for engaging the inner edge of the chain 46 to guide and flex the chain edgewise in an arcuate path extending through approximately 90°. The periphery of the wheel conforms to the aforesaid arc 52. The wheel 64 has an outwardly projecting annular flange 66 at the top which flange overlies the inner edge portion of the chain.

Secured to the plate 60 by welding or otherwise is a vertical plate 68 which is curved to approximately conform to the path of the outer edge of the chain 46. Similarly secured to the plate 60 are vertical plates 70 and 72 which are adjacent the path of the inner edge of the chain. Also secured to the plate 60 is a vertical plate 74 which conforms to the periphery of the wheel 64 and is connected at its ends with the vertical plates 70 and 72. The plates 68, 70 and 72 cooperate with the guide wheel 64 to prevent the escape of feed from the chain at the edges thereof, the said plates thus serving to hold the feed in engagement with the chain.

At the rearward side of the corner unit the walls 68 and 70 are bent to provide a notch having diverging vertical walls 76 and 78 adapted to receive a special trough section 80 forming a part of the trough 30 and having diverging flanges 82, 82 at its end which are between the walls 76 and 78. The end of the bottom wall of the trough section 80 rests upon the plate 60. The walls 76 and 78 are spaced apart to a greater extent than the flanges 82, 82 so that the trough section 80 is transversely adjustable to a limited extent.

At the forward side of the corner unit, the walls 68 and 72 are bent to provide a notch having diverging vertical walls 84 and 86 adapted to receive a special trough section 88 similar to the trough section 80 and forming a part of the trough 28. The trough section 88 has diverging flanges 90, 90 at its end which are between the walls 84 and 86. The end of the bottom wall of the trough section 88 rests upon the plate 60. The walls 84 and 86 are spaced apart to a greater extent than the flanges 90, 90 so that the trough section 88 is transversely adjustable to a limited extent.

Preferably, an arcuate horizontal plate 92 is provided which is secured to the plate 60 and which is shaped to conform to the periphery of the wheel 64 and to the curvature of the vertical plate 68. The plate 92 supports the chain and prevents it from tilting downwardly below a transversely horizontal position. The upper face of the plate 92 is at the same level as the upper faces of the bottom walls of the trough sections 80 and 88, the chain thus being supported at a uniform level as it passes through the corner unit and around the guide wheel 64.

As has been stated, the chain 46 is under tension and when it is flexed edgewise to pass around the guide wheel 64, there is a tendency for it to tilt upwardly out of its transversely horizontal position. To prevent any such tilting of the chain, auxiliary guide wheels 94 and 96 are provided. The guide wheel 94 is near the rearward side of the unit and is approximately midway between the edges of the chain. The said wheel 94 has a hollow hub 95 which is rotatable on a horizontal bearing pin extending through suitable apertures in the vertical walls 68 and 70. The guide wheel 96 is located approximately midway of the arc of engagement of the chain with the main guide wheel 64 and it is near the outer edge of the chain. The said wheel 96 is rotatably supported on a horizontal bearing stud 97 secured to the vertical wall 68.

A cover plate 98 is provided, a portion of this cover plate being shown in Fig. 6 and complete cover plates being shown on the units 32 and 38 in Fig. 2. The cover plate rests upon the vertical walls 68, 70, 72 and 74 and is preferably shaped to conform approximately to the curvature of the walls 68 and 74. The cover plate keeps the poultry away from the movable parts of the corner unit.

There is a tendency for the chain 46 to approach and leave the guide wheel 64 at small angles to longitudinal and lateral lines as shown in Fig. 6. The magnitude of these angles cannot be exactly predicted and it is for this reason that the trough sections 80 and 88 are transversely adjustable within narrow limits as previously stated.

At the rearward side of each of the corner guide units 34 and 36, a guard is provided for preventing fowls and more particularly small chicks from being carried by the chain into the corner unit. As shown, the guard is an inclined metal plate 100 secured to the cover plate 98. The guard is clearly shown in Fig. 10.

The plate 60 and the several parts carried thereby are vertically adjustable in conformity with the vertical adjustment of the troughs, the trough adjustment having been already described in connection with Fig. 4. A supporting means is provided for the plate 60 which permits the required vertical adjustment. As shown, a framework is provided which includes four vertical angle bars 102, 104, 106 and 108, these angle bars being positioned to engage the corners of the plate 60. The four vertical angle bars prevent horizontal movement of the plate 60 while permitting vertical adjustment thereof.

The angle bars 102 and 104 are connected with a horizontal angle bar 110 which is adapted to be secured to the floor. Similarly, the angle bars 106 and 108 are connected to a horizontal angle bar 112 also adapted to be secured to the floor. Preferably a diagonal brace 114 is connected with the vertical angle bar 102 and with the horizontal angle bar 110. A similar diagonal brace 116 is connected with the vertical angle bar 106 and with the horizontal angle bar 112. The angle bars 106 and 108 are provided with vertical series of holes 118, 118, as shown in Figs. 7 and 8. The angle bars 102 and 104 are provided with similar holes. Two horizontal rods 120 and 122 are provided, the rod 120 being adapted to extend through any two aligned holes in the angle bars 106 and 108 and the rod 122 being adapted to extend through any two of the similar aligned holes in the angle bars 102 and 104. The rods 120 and 122 are readily removable and it will be seen that by placing the rods in properly selected holes the plate 60 and the parts carried thereby can be supported at any one of several levels. Thus the plate 60 can be vertically adjusted in conformity with the vertical adjustment of the several troughs.

Preferably, the angle bars 102 and 108 are connected by a horizontal brace 124 and the angle bars 104 and 106 are connected by a similar horizontal brace 126. The braces 124 and 126 are connected with the angle bars by means of bolts 128, 128 passing through two of the holes 118 in the angle bars 102 and 108 and passing through two of the holes in the angle bars 104 and 106. If it is necessary to raise the supporting rods 120 and 122 to positions where they would interfere with the braces 124 and 126 positioned as shown, the said braces can be moved to a lower level to avoid the interference.

At locations where the troughs 26 and 28 and the chain 46 extend through the partitions 12, 16 and 18, a suitable guard is preferably provided to prevent fowls and more particularly small chicks from being carried through the partitions by the chain. As to details, the guards may be widely varied, but one suitable construction is shown in Figs. 11 and 12. A plate 130 is secured to the partition, as for instance the partition 18, immediately above the trough, as for instance the trough 26. A vertical plate 132 is pivotally connected with the plate 130, the plate 132 extending within the trough. As shown, the plate 132 is pivotally connected with the plate 130 by means of wire rings 134, 134. As has been stated, the trough is vertically adjustable and the plate 130 is therefore connected with the partition in such a manner that it may be vertically adjusted in conformity with the vertical adjustment of the trough. The plate 130 has a vertical slot 136 therein and a bolt 138 extends through the partition and through the slot. A wing nut 140 on the bolt 138 engages the plate 130 to hold it in any desired position of vertical adjustment.

*Drive unit and associated parts*

The drive unit as shown in Figs. 2 and 3 and in Figs. 13 to 18 includes a main framework on which the various operating parts are carried. The framework is generally rectangular and it includes four vertical angle bars 142, 142 at the corners. The upper ends of the vertical angle bars are connected at the sides of the framework by horizontal longitudinal angle bars 144, 144, and they are connected at the ends of the framework by transverse horizontal flat bars 146, 146. The lower ends of the vertical angle bars are connected at the sides of the framework by horizontal longitudinal flat bars 148, 148 and they are connected at the ends of the framework by transverse horizontal flat bars 150, 150.

Mounted between and connected with the lower portions of the four angle bars 142, 142 is a sheet metal pan 152 having a bottom wall 154, side walls 156, 156 and an end wall 158 at the left. Preferably, the side walls 156, 156 have inturned flanges 160, 160 at the tops thereof as shown in Fig. 14. Oppositely disposed vertical angle bars 162, 162 connect the flanges 160, 160 with the longitudinal angle bars 144, 144.

A horizontal driving drum 164 is provided at the right end of the framework, this drum being mounted on a horizontal shaft 166 rotatable in bearing brackets carried by the corresponding vertical angle bars 142, 142. The drum 164 is driven by a power unit mounted on the top of the framework, this power unit comprising a motor 168 and a speed reducing gear mechanism 170 provided with a sprocket wheel 172. A chain 174 passes around the sprocket wheel 172 and also around a sprocket wheel 176 on the shaft 166 which carries a drum 164. By means of the mechanism described, the drum 164 is rotated in the clockwise direction as indicated by the arrow.

The chain 46 extends from the corner guide unit 38 around the drum 164 and is looped backwardly about a horizontal idler drum 178 partly within the pan 152. From the bottom of the idler drum 178 the chain extends forwardly toward the right. The idler drum 178 is mounted on a horizontal shaft 180 which projects outwardly through longitudinal slots 182 in the side walls 156 of the pan. The shaft 180 is mounted at its ends in bearing blocks 184, 184 which are longitudinally movable in guideways formed by angle bars 186 secured to the side walls 156, 156. Each bearing block 184 is connected with a horizontal non-rotatable screw 188 which extends through a stationary bracket 190 as shown in Fig. 3. Each screw carries a nut 192. By turning the nuts 192 on the screws 188 the bearing blocks can be moved in their guideways so as to move the drum 178 toward the left, thus tightening the chain 46 and taking up any slack therein.

In order to more definitely assure the driving of the chain by the driving drum 164, a pressure wheel 194 is provided immediately below the drum 164, this pressure wheel being in position to engage the chain 46. The pressure wheel 194 is carried by a shaft 196 mounted in bearing brackets 198. The bearing brackets 198 are vertically adjustable along the corresponding angle bars 142 and they may be moved upward by means of screws 200. By turning the screws 200 the bearing brackets may be moved upwardly to force the pressure wheel 194 into engagement with the chain. Thus the chain is pinched to a slight extent between the drum 164 and the pressure wheel 194 and this prevents any slippage of the driving drum with respect to the chain.

For guiding the chain from the corner unit 36 to the driving drum 164 there are provided two special trough sections 202 and 204 which are inclined upwardly toward the right, as shown in Figs. 3 and 13. In order to change the direction of chain movement at the entrance to the trough section 202, the corner unit 36 is provided with two small guide wheels 206, 206 as shown in Figs. 2 and 3. The wheels 206, 206 are positioned to engage the chain 46 near the edges thereof, and the said wheels are carried by the vertical walls 68 and 72 of the corner unit. The wheels 206, 206 hold the chain in horizontal position until it reaches or nearly reaches the inclined trough section 202.

The trough section 202 has diverging flanges 208, 208 similar to the flanges on the trough section 88 but so related to the trough section as to permit the trough section to be inclined as shown. At its upper right end the trough section 202 enters and is supported by the trough section 204. The trough section 204 has a hinged connection at 210 with a transverse bar 212 secured to the vertical angle bars 162, 162. The transverse bar 212 is vertically adjustable being held by bolts 214, 214 passing through vertical slots 216, 216 in the angle bars 162, 162. The trough section 204 is supported at its left end by means of a cross rod 218 which extends through vertical slots 220 in the vertical angle bars 142 at the left. By means of wing nuts on the cross rod 218 the said cross rod may be secured in place at any elevation so as to change the angle of inclination of the trough section 204.

The primary reason for the adjustable mounting of the trough section 204 is to enable the two trough sections 202 and 204 to support the chain in a substantially straight line which is tangent to the driving drum 164. For different installations there may be different distances between the corner guide unit 36 and the drive unit 40. With the trough section 204 adjustable as described, the trough sections 202 and 204 may be kept in a straight line tangent to the drum, notwithstanding variations in the distance between the corner unit 36 and the drive unit 40.

It has been stated that the chain passes toward the right from the bottom of the idler drum 178. In so moving the chain is supported by the bottom wall 154 of the pan and by a trough section 222. The lower portion of the pan is partly closed at the right by two plates 224, 224 having inclined flanges 226, 226. The side walls of the trough section 222 are bent to form flanges 228, 228 which are adjacent the before-mentioned flanges 226, 226. The chain passes from the bottom of the pan onto the bottom of the trough section 222.

When the chain 46 returns to the drive mechanism after passing through the several pens, it still carries a limited amount of residual feed more particularly in the interstices thereof. Under some circumstances it is desirable to retain the residual feed in the system so that it can be again moved into and through the several troughs, and under other circumstances it is desirable to remove the residual feed so that it cannot be recirculated. It will be seen that the chain 46 moves through the drive unit along two superposed paths, the upper path extending diagonally upwardly toward the top of the drum 164 and the lower path extending horizontally toward the right from the bottom of the drum 178. These superposed paths are utilized for handling the residual feed.

The trough sections 202 and 204 together with the corner unit 36 constitute means extending from the forward end of the trough 28 to the upper of the said superposed paths for supporting the chain and for supporting feed moved thereby. The bottom wall of the trough section 204 has an opening 229 providing a terminal edge 230 beyond which the feed is no longer supported. At or immediately beyond the said terminal edge 230 the feed moves downwardly by gravity. The feed falls onto the section of chain between the drum 164 and the drum 178 and most of the feed which falls onto the last said portion of the chain will pass through the said portion of the chain and onto the portion of the chain in the lower of the said superposed paths at the right of the drum 178. Some of the feed may be carried toward the left over the drum 178 and into the left portion of the pan 152. The feed may accumulate in the said left portion of the pan, but after a limited amount of accumulation the feed will be caught by the chain and moved thereby toward the right along the lower of the said superposed paths. The space in the pan at the left of the idler drum 178 is relatively large so as to permit the drum to be moved toward the left as necessary for maintaining proper tension in the chain.

Preferably a chain actuated vibrator engages the chain adjacent the terminal edge 230 to facilitate the separation of the feed from the chain. As shown, the vibrator is a relatively large horizontal tube 232 located in the trough section 204 above the opening therein, this tube being held in place by a transverse rod 234 carried by the side walls of the trough section 204. The tube 232 engages the chain and by a combined rolling and vibratory motion serves to assist in the discharge of the feed from the chain.

When the chain has passed through the troughs in the several pens it will have accumulated a certain amount of debris, such as feathers and droppings. Provision is made for eliminating at least the major portion of the debris so that it will not be recirculated. The larger pieces of debris lie on top of the chain and will not pass with the feed through the interstices thereof immediately beyond the terminal edge 230. These larger pieces of debris are carried over the drive drum 164 and when the chain is at least partly inverted the said pieces are discharged by gravity. A suitable means is provided for preventing the debris from falling into the trough section 222. As shown, the said larger pieces of debris are deposited in a catch pan such as that shown at 235.

Smaller pieces of debris will fall with the feed through the interstices of the chain and provision is made for separating such debris from the feed. For this purpose a deflector device is provided which includes an inclined plate 236, the deflector device being supported at its upper end by hooks 238, 238. The plate 236 has narrow slots which are vertically below the opening in the trough section 204 and which extend longitudinally of the plate. Preferably the plate has an opening 240, and spaced longitudinal wires 242 extend across the opening, being secured to the plate. The said narrow slots are between the said wires. The wires 242 serve to catch most of the debris which then slides downwardly along the plate 236 to the side of the machine. The debris may fall onto the floor, or a receptacle, not shown, may be provided for receiving it. The feed will pass through the slots between the wires 242 and onto the portion of the chain in the lower of the said superposed paths as already described.

Under other conditions it is desirable to entirely remove the residual feed from the chain at the drive unit so as to prevent recirculation thereof. This may be desirable, for instance, when there is to be a change in the type of feed to be supplied. When the feed is to be entirely removed, a supplemental plate 244 is put in place on the plate 236 to cover the opening 240, as shown in Figs. 17 and 18. The plate 244 is provided with hooks 246, 246 which extend between the wires 242, 242 and into engagement with the plate 236 at the bottom of the opening 240. The said hooks hold the plate 244 in place as shown. When the plate 244 is used, both the debris and the feed are caught by the plate 236 and are discharged at the side of the machine onto the floor or into a suitable receptacle.

When the several troughs and the several corner units are vertically adjusted as previously described, the drive mechanism and associated parts must be correspondingly adjusted vertically. In order that this may be done the drive mechanism is vertically adjustably connected with a base frame which is supported on the floor. The base frame is rectangular and it comprises two longitudinal angle bars 248, 248 and two transverse angle bars 250, 250. Secured to the base frame are four uprights 252, 252 and 254, 254. These uprights may be variously positioned, but as shown the uprights 252, 252 are at the sides of the framework near the right end thereof and of the framework. As shown, each upright comprises a channel-shaped member. Secured to the main framework are brackets 256, 256 and 258, 258 which are positioned to embrace and fit the respective uprights. Screws 260, 260 extend through threaded apertures in the several brackets, these screws being engageable with the several uprights. When the driving unit is to be vertically adjusted, the several screws 260, 260 are loosened and the drive unit is raised or lowered so as to be at the proper elevation. Then the screws 260, 260 are tightened to hold the driving unit in its adjusted position.

*Feed supplying unit*

The feed supplying unit 42 is shown in detail in Figs. 19 to 23. A generally rectangular hopper 262 is provided, the hopper having inclined bottom walls 264 which terminate in a trough portion 266 through which the chain 46 passes. The width of the trough portion is approximately the same as the width of the several troughs, the width thus being such that it approximately fits the chain. The before-mentioned trough section 222 extends into and fits the trough portion 266 of the hopper, as clearly shown in Figs. 19 to 22. A trough section 268 extends between the opposite end of the trough portion 266 of the hopper and the corner unit 38, as shown in Figs. 2 and 3.

Preferably, the hopper is provided with a transverse partition 270 which may be removable. When the partition 270 is removable, the side walls of the hopper carry vertical channel members 272, 272 for receiving the partition and for holding it in place. The partition can be removed by moving it vertically upward. The partition when in place provides a forward feed chamber 274 and a separate rearward feed chamber 276. When the hopper is provided with the partition 270 and with the chambers 274 and 276 it is adapted for supplying either or both of two different kinds of feed to the chain 46. For instance, feed in mash form may be placed in the forward chamber 274 and feed such as whole grain or pellets may be placed in the rearward chamber 276.

The chamber 274 may be closed or partly closed at the bottom by a horizontally movable slide gate 278 which is movable through a slot at the top of the trough portion 266 of the holder. The gate 278 has openings 279, 279ª for receiving the fingers of the attendant to facilitate gate movement. The slide gate 278 is supported on bars 280, 280 carried by the said trough portion. When no mash is to be supplied, the slide gate 278 is moved toward the right from the position shown in Figs. 21 and 22 so as to entirely close the bottom of the chamber 274. When the slide gate is in the withdrawn position shown, the mash can pass downwardly from the chamber 274 and onto the chain 46.

The chamber 276 may be partly closed at the bottom by a horizontally movable slide gate 282 which is also movable through a slot at the top of the trough portion 266 of the hopper. Preferably a single continuous slot is provided for the two slide gates 278 and 282. The slide gate 282 is supported on a bar 284 similar to the bars 280, 280 and carried by the said trough portion 266. The gate 282 has an opening 283 for receiving the fingers of the attendant to facilitate gate movement. The slide gate 282 is normally in position below the chamber 276 and it has a notch 286 through which pellets can pass downwardly by gravity.

The partition 270 carries a gate 288 which is vertically movable in guides 290, 290. Connected with the gate 288 is a vertical rod 292 which extends through a guide ring 294 secured to the partition 270. Secured to the rod 292 at the upper end thereof is a handle 296. By means of the handle 296 the gate 288 may be raised or lowered. Carried by the rod 292 is a washer 298 which engages the ring 294 to limit downward movement of the rod 292 and of the gate 288. When the rod 292 and the gate 288 are raised, the handle 296 may be moved to the position shown by dotted lines in Fig. 19 so as to engage the top of the partition, the gate being thus held in its upper position.

At the right end of the hopper, as viewed in Fig. 19, is a gate 300 which is vertically movable in guides 302, 302 carried by the right wall of the hopper. The gate 300 has a vertical slot therein through which a bolt extends. By means of a wing nut 304 on the bolt the gate 300 may be clamped in adjusted position.

When only mash is to be fed, the gate 288 is raised to its uppermost position. A thick layer of mash is supplied to the moving chain 46, but the gate 300 is adjusted to such a position as to determine the thickness of the layer of mash to be discharged from the hopper below the gate. When mash is being fed as described, it is immaterial whether there are or are not any pellets in the chamber 276. If there are pellets in the said chamber, the thick layer of mash below the slide 282 prevents any pellets from moving through the notch 286.

When only pellets are to be supplied, no mash is placed in the chamber 274 or alternatively the slide gate 278 is moved inwardly to entirely close the bottom of the chamber 274. Pellets are then supplied to the chain through the notch 286 in the slide gate 282 and the gate 300 is adjusted to determine the thickness of the layer of pellets to be discharged.

It is sometimes desirable to supply both mash and pellets. In such event, the gate 288 is moved to or near its lowermost position so as to permit the supplying to the chain of at least enough mash to fill the interstices thereof. The gate 288 may be substantially in contact with the chain or it may be slightly above it to permit the supply of a very thin layer of mash above the chain. Pellets are supplied as above-described through the notch 286 and the gate 300 is adjusted to determine the thickness of the layer of pellets on top of the layer of mash.

Under some conditions of operation no feed in pellet form is to be supplied and it is desirable to provide a larger hopper capacity for mash. Under these circumstances the partition 270 is removed and the slide gates 278 and 282 may be replaced by a single longer slide gate 306, as shown in Fig. 23.

It is sometimes necessary or desirable to remove all of the feed from the troughs and from the chain without removing the feed from the hopper. In such event, if there are no pellets in the chamber 276, the slide 278 is moved inwardly to entirely close the bottom of the chamber 274; or, if there are pellets in the chamber 276, the slides 278 and 282 are removed and replaced by the slide 306 which is moved inwardly to entirely close the bottoms of both chambers.

An agitator is provided in the mash chamber 274 and this agitator includes a longitudinal shaft 308 mounted in bearings 310 and 312 on the end walls of the hopper. For rotating the shaft 308 a worm wheel 314 is secured thereto, this worm wheel meshing with a worm 316 on a transverse shaft 318. A sprocket wheel 320 is secured to the shaft 318. A chain 322 passes around the sprocket wheel 320 and also around a sprocket wheel 324 on the shaft 166 which drives the drum 164. By means of the mechanism described, the shaft 308 is slowly rotated.

Secured to the shaft 308 within the chamber 274 are two discs 326 and 328. Longitudinal wires 330, 330, preferably under tension, extend longitudinally between the discs 326 and 328 near the peripheries thereof. The number of wires 330, 330 may be varied, but it has been found from experience that only two wires are sufficient and ordinarily preferable. The rotating wires 330, 330 cut through the mash in the chamber 274, the wires serving to agitate the mash and to prevent any bridging thereof. As the result of agitation of the mash by the wires 330, 330, it flows freely downward into the trough section 266 of the hopper.

When the several troughs and the several corner units and the drive unit are vertically adjusted, as previously described, the hopper unit must be correspondingly adjusted vertically. In order that this may be done the hopper unit is vertically adjustably connected with a base frame which is supported on the floor. The base frame is rectangular and it comprises two longitudinal angle bars 332, 332 and two transverse angle bars 334, 334. Secured to the base frame are four uprights 336, 336 and 338, 338. The uprights 336, 336 are closely adjacent the right wall of the hopper, as shown in Fig. 19, and the uprights 338, 338 are closely adjacent the left wall of the hopper. Secured to the last said hopper walls are brackets 340, 340 and 342, 342 which are positioned to embrace and fit the respective uprights. Screws 344, 344 extend through threaded apertures in the several brackets, these screws being engageable with the several uprights. When the hopper unit is to be vertically adjusted, the several screws 344, 344 are loosened and the hopper unit is raised or lowered so as to be at the proper elevation. Then the screws 344, 344 are tightened to hold the hopper unit in its adjusted position.

*Summary of operation*

By means of the drive unit 40 the chain is moved in a generally counter-clockwise direction through and along the troughs 26, 30 and 28 and through the several corner units and through the feed supplying unit 42. By means of the said unit 42 feed of a selected type or of selected types is supplied to the chain, the feed entering the interstices of the chain and, if desired or necessary, also lying in a layer on top of the chain. The chain carries the feed to the three feeding troughs 26, 30 and 28 in the several pens such as the pens 20, 22 and 24.

The timing of the apparatus may be varied, but advantageously the chain 46 is moved relatively rapidly and to an extent sufficient to move feed laden portions thereof from the feed supplying unit 42 to the forward end of the trough 28. The chain movement is then stopped and the feed in the several troughs is available to the poultry for whatever feeding period may be determined upon. After a suitable relatively long period of feeding time the chain is again moved to the same extent to again provide a new supply of feed in the troughs in the several pens.

The successive relatively rapid movements of the chain to the extent stated with relatively long intervening feeding periods make substantially the same amounts of feed available in all of the pens for each of the successive periods. If the chain were to be moved slowly, substantial amounts of feed would be consumed by the poultry in the first pens with the result that lesser amounts would be available to the poultry in the other pens.

The successive portions of the chain returning to the drive unit 40 during each chain movement carry some residual feed. The residual feed consists in part of feed that was within the troughs and not consumed and it consists in part of feed that was within the corner units and not accessible to the poultry. The successive portions of the chain returning to the drive unit also carry debris, such as feathers and droppings.

As the chain passes through the drive unit the larger pieces of debris are discharged into the catch pan 235. If there is to be no change in the type of feed for the next cycle the plate 244 is not used and the deflector device on the drive unit serves to remove the smaller pieces of debris as previously described. The residual feed passes between the deflector wires 242 and is returned to the chain. The chain carries the residual feed through the feed supplying unit where additional feed is supplied to the required extent.

If there is to be a change in the type of feed the plate 244 is put in place and the deflector device serves to remove both the smaller pieces of debris and the residual feed, as previously described.

For operating the chain in the manner described the motor 168 may be started and stopped by a manually operable switch. Preferably, however, a conventional automatic clock controlled switch is provided which causes the operation of the motor to the required extents at proper intervals.

A flat wide articulated belt or chain, such as shown and described, has numerous advantages over other chains which have heretofore been used in poultry feeding apparatus. One of the more important advantages is that the wide articulated chain fully engages with the entire layer of feed and maintains the said layer intact throughout the entire path of movement thereof. In some prior feeders, relatively narrow chains have been used which only partly covered the bottoms of the troughs, there being much lost motion of the chain. In such feeders the feed movement lags very substantially with respect to the chain movement and it is sometimes necessary to operate the chain continuously in order to provide enough feed for the poultry in the more remote pens. Under these conditions, there is an excess of feed in the troughs in the nearer pens and insufficient feed in the troughs in the more remote pens.

In some other prior feeders, chains have been provided having wings or blades thereon for engaging the feed to move it. In such feeders, the birds must reach between the blades in order to feed, and this is highly objectionable, particularly when the blades are moving. The beaks of the birds engage the blades and become oversensitive, this causing a serious lessening of feed intake. With a chain such as herein shown and described, a broad flat unobstructed layer of feed is available to the birds and there is nothing that projects above the feed layer to interfere with feeding. The timing of the successive chain movements may be so controlled that the birds consume only the feed which lies in a layer above the top of the chain. Alternatively, however, the timing of the chain movements may be such that the birds also consume the major portion of the feed within the interstices of the chain. Under the last stated conditions, the beaks of the birds may sometimes engage the relatively small wires of the chain, but this is unobjectionable.

The flat wide articulated belt or chain is particularly advantageous in connection with a feed supply unit such as shown and described. A chain of this type makes it possible to accurately determine and control the amount of feed to be supplied, and also makes it possible to supply two different types of feed simultaneously, the proportions of the feed of the two types being closely controlled.

Furthermore, with chains of the types heretofore used, the feed instead of being moved in an intact layer is subjected to a dragging or rolling action which results in the grinding of the feed between the chain and the trough. This pulverizes the feed and reduces it to a powder form which is unacceptable to the birds, much of the feed being thus wasted.

A chain such as used in the present feeder not only has the above-stated advantages, but in addition it is freely flexible both horizontally and vertically. It can be flexed horizontally to pass around the guide wheels of the corner units while remaining in engagement with the broad flat layer of feed, and it can be flexed vertically for engagement with the driving drum and with the idler drum.

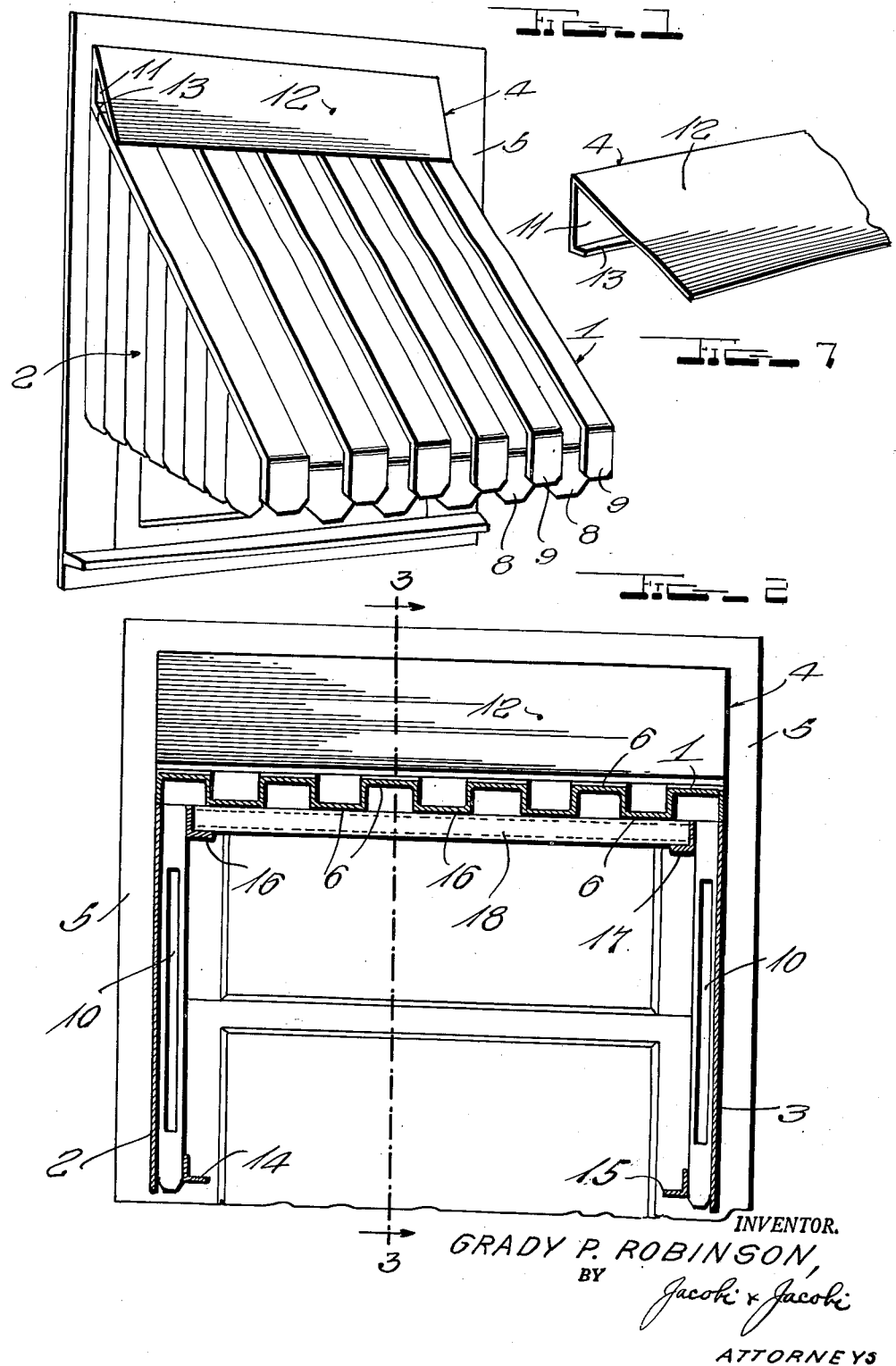

The invention claimed is:

1. In a poultry feeding apparatus, the combination of a longitudinally extending feeding trough, an endless openwork chain movable through the trough and guided for movement along an elevated path beyond the forward end of the trough, means extending from the forward end of the trough and located immediately below the portion of the chain in the said elevated path for supporting feed being moved by the chain along the last said path, the said feed supporting means having a terminal edge so that feed moved by the chain is disengaged therefrom by gravity at or beyond the said edge, means for supplying power to the chain to drive it in the forward direction, and means for supplying feed to be moved by the chain along the said trough.

2. In a poultry feeding apparatus, the combination of an endless openwork chain guided for movement along a horizontal path and along two superposed paths, means for driving the chain to move it along the said horizontal path and along the two superposed paths, means for supplying feed to be moved by the chain, a feeding trough at a portion of the said horizontal chain path for supporting the chain and for supporting feed moved thereby, means at the lower of the two superposed chain paths for supporting the chain and for supporting feed moved thereby, and supporting means extending from the forward end of the trough to the upper of the two superposed chain paths for supporting the chain and for supporting feed moved thereby, the last said supporting means having a terminal edge above the first said supporting means so that feed moved by the chain is disengaged therefrom at or beyond the said edge and falls onto the first said supporting means and is there again engaged by the chain.

3. In a poultry feeding apparatus, the combination of a longitudinally extending feeding trough, an endless openwork chain movable through the trough and guided for movement along two superposed paths beyond the forward end of the trough, means extending from the forward end of the trough and located immediately below the portion of the chain in the upper of said superposed paths which means serves to support feed moved by the chain along the last said path, the said feed supporting means having a terminal edge so that feed moved by the chain is disengaged therefrom by gravity at or beyond the said edge, deflecting means interposed between the said superposed paths and beneath the said terminal edge for laterally deflecting feed moving downward from the said edge, means for supplying power to the chain to drive it in the forward direction, and means for supplying feed to be moved by the chain along the said trough.

4. In a poultry feeding apparatus, the combination of a longitudinally extending feeding trough, an endless openwork chain extending through the trough and guided to a partly inverted position beyond the forward end of the trough to permit debris to fall therefrom, means for applying power to the chain to drive it in the forward direction, and means for supplying feed to be moved by the chain along the said trough.

5. In a poultry feeding apparatus, the combination of a longitudinally extending feeding trough, an endless openwork chain movable through the trough and guided for movement along an elevated path beyond the forward end of the trough and further guided for movement to a partly inverted position beyond the said elevated path to permit debris to fall therefrom, means extending from the forward end of the trough and located immediately below the portion of the chain in the said elevated path for supporting feed being moved by the chain along the last said path, the said feed supporting means having a terminal edge so that feed moved by the chain is disengaged therefrom by gravity at or beyond the said edge, means for supplying power to the chain to drive it in the forward direction, and means for supplying feed to be moved by the chain along the said trough.

6. In a poultry feeding apparatus, the combination of a longitudinally extending feeding trough, an endless openwork chain movable through the trough and along two superposed paths beyond the forward end of the trough, the chain being partly inverted in moving from the upper of the said paths to the lower of the said paths to permit debris to fall therefrom, means extending from the forward end of the trough and located immediately below the portion of the chain in the upper of the said superposed paths which means serves to support feed being moved by the chain along the last said path, the said feed supporting means having a terminal edge so that feed moved by the chain is disengaged therefrom by gravity at or beyond the said edge, deflecting means interposed between the said superposed paths and beneath the said terminal edge for laterally deflecting feed moving downward from the said edge, means for supplying power to the chain to drive it in the forward direction, and means for supplying feed to be moved by the chain along the said trough.

7. In a poultry feeding apparatus, the combination of a longitudinally extending horizontal feeding trough having a flat bottom, an endless openwork articulated chain comprising transversely extending generally horizontal interlaced wires which chain is freely flexible and has a width substantially greater than its thickness and which chain has interstices between the wires for receiving and moving feed, the said chain having a portion extending through and supported by the trough, means including chain guiding units adjacent the ends of the trough for flexing the chain and for guiding it from the forward end of the trough to the rearward end thereof, means for applying power to the chain to drive it in the forward direction, and means for supplying feed to be moved by the chain along the said trough.

8. In a poultry feeding apparatus, the combination of a longitudinally extending horizontal feeding trough having a flat bottom, two rotatable horizontal chain engaging drums at different levels, an endless openwork articulated chain comprising transversely extending generally horizontal interlaced wires which chain is freely flexible and has a width substantially greater than its thickness and which chain has interstices between the wires for receiving and moving feed, the said chain having a portion extending through and supported by the trough and the said chain having other portions extending partly around the respective chain engaging drums, means including chain guiding units adjacent the ends of the trough for flexing the chain and for guiding it from the forward end of the trough to the said drums and thence to the rearward end of the trough, means for applying power to rotate one of the said drums and to thereby drive the chain in the forward direction, and means for supplying feed to be moved by the chain along the said trough.

9. In a poultry feeding apparatus, the combination of a longitudinally extending horizontal feeding trough having a flat bottom, two rotatable horizontal chain engaging drums at different levels, an endless openwork articulated chain comprising transversely extending generally horizontal interlaced wires which chain is freely flexible and has a width substantially greater than its thickness and which chain has interstices between the wires for receiving and moving feed, the said chain having a portion extending through and supported by the trough and the said chain having other portions extending partly around the respective chain engaging drums, means including chain guiding units adjacent the ends of the trough for flexing the chain and for guiding it from the forward end of the trough to the said drums and thence to the rearward end of the trough, means for applying power to rotate one of the said drums and to thereby drive the chain in the forward direction, means for moving the other of the drums longitudinally of the chain to take up chain slack, and means for supplying feed to be moved by the chain along the said trough.

10. In a poultry feeding apparatus, the combination of a longitudinally extending horizontal feeding trough having a flat bottom, two rotatable horizontal chain engaging drums beyond the forward end of the trough and at different levels, an endless openwork articulated chain comprising transversely extending generally horizontal interlaced wires which chain is freely flexible and has a width substantially greater than its thickness and which chain has interstices between the wires for receiving and moving feed, the said chain having a portion extending through and supported by the trough and the said chain having other portions extending partly around the respective upper and lower chain engaging drums and positioned in superposed paths adjacent the drums, means including chain guiding units adjacent the ends of the trough for flexing the chain and for guiding it from the forward end of the trough to the said drums and thence to the rearward end of the trough, means extending from the forward end of the trough and located immediately below the portion of the chain in the upper of the said superposed paths which means serves to support feed being moved by the chain along the last said path, the said feed supporting means having a terminal edge above the lower of the said superposed paths so that feed moved by the chain is disengaged therefrom by gravity at or beyond the said edge and falls onto the chain in the said lower of the superposed paths, means for applying power to the chain to drive it in the forward direction, and means for supplying feed to be moved by the chain along the said trough.

11. A poultry feeding apparatus as set forth in claim 10, having a chain actuated vibrator engaging the chain adjacent the said terminal edge of the feed guiding means.

12. In a poultry feeding apparatus, the combination of a longitudinally extending horizontal feeding trough having a flat bottom, two rotatable horizontal chain engaging drums beyond the forward end of the trough and at different levels, an endless openwork articulated chain comprising transversely extending generally horizontal interlaced wires which chain is freely flexible and has a width substantially greater than its thickness and which chain has interstices between the wires for receiving and moving feed, the said chain having a portion extending through and supported by the trough and the said chain having other portions extending partly around the respective upper and lower chain engaging drums and positioned in superposed paths adjacent the drums, means including chain guiding units adjacent the ends of the trough for flexing the chain and for guiding it from the forward end of the trough to the said drums and thence to the rearward end of the trough, means extending from the forward end of the trough and located immediately below the portion of the chain in the upper of the said superposed paths which means serves to support feed being moved by the chain along the last said path, the said feed supporting means having a terminal edge above the lower of the said superposed paths so that feed moved by the chain is disengaged therefrom by gravity at or beyond the said edge, deflecting means interposed between the superposed paths and beneath the said terminal edge for laterally deflecting feed moving downward from the said edge, means for applying power to the chain to drive it in the forward direction, and means for supplying feed to be moved by the chain along the said trough.

13. In a poultry feeding apparatus, the combination of a longitudinally extending horizontal feeding trough having a flat bottom, two rotatable horizontal chain engaging drums beyond the forward end of the trough and at different levels, an endless openwork articulated chain comprising transversely extending generally horizontal interlaced wires which chain is freely flexible and has a width substantially greater than its thickness and which chain has interstices between the wires for receiving and moving feed, the said chain having a portion extending through and supported by the trough and having other portions extending partly around the respective upper and lower drums and positioned in superposed paths adjacent the said drums and a portion of the said chain being partly inverted as it passes partly around the upper drum, means including chain guiding units adjacent the ends of the trough for flexing the chain and for guiding it from the forward end of the trough to the said drums and thence to the rearward end of the trough, means extending from the forward end of the trough and located immediately below the portion of the chain in the upper of the said superposed paths which means serves to support feed being moved by the chain along the last said path, the said feed supporting means having a terminal edge above the lower of the said superposed paths so that feed moved by the chain is disengaged therefrom by gravity at or beyond the said edge, means adjacent the said upper drum for receiving pieces of debris which are too large to pass through the chain and which are discharged from the partly inverted portion of the chain, means for applying power to the chain to drive it in the forward direction, and means for supplying feed to be moved by the chain along the said trough.

14. A poultry feeding apparatus as set forth in claim 13, wherein a laterally inclined deflector is interposed between the said superposed paths and beneath the said terminal edge, the said deflector having narrow slots for the downward movement of feed therethrough onto the chain in the lower of the superposed paths and the said deflector serving to laterally deflect pieces of debris which pass through the chain but which are too large to pass through the slots.

15. A poultry feeding apparatus as set forth in claim 14, wherein there is an optionally useable plate for covering the slots in the deflector, the said plate and the said deflector cooperating to laterally deflect both feed and pieces of debris which fall from the chain at or beyond the said terminal edge of the feed supporting means.

16. In a poultry feeding apparatus, the combination of two longitudinally extending and laterally spaced horizontal feeding troughs having flat bottoms, an endless openwork articulated chain comprising transversely extending generally horizontal interlaced wires which chain has a width substantially greater than its thickness and has interstices between the wires for receiving and moving feed, the said chain being freely flexible edgewise and having portions extending through and supported by the troughs, means adjacent the ends of the troughs for flexing the chain edgewise while maintaining it transversely horizontal and for guiding the transversely horizontal chain in lateral paths from the forward end of each trough to the rearward end of each other trough, means below one lateral path of movement of the chain for retaining feed in engagement therewith from one trough to the other, means for applying power to the chain to drive it in the forward direction, and means for supplying feed to be moved by the chain along the said troughs and along the last said lateral path.

17. In a poultry feeding apparatus, the combination of two parallel longitudinally extending and laterally spaced horizontal feeding troughs having flat bottoms, a third similar feeding trough extending laterally between the forward end of one longitudinal trough and the rearward end of the other longitudinal trough, an endless openwork articulated chain comprising transversely extending generally horizontal interengaging wires which chain has a width substantially greater than its thickness and has interstices between the wires for receiving and moving feed, the said chain being freely flexible edgewise and having portions extending through and supported by the troughs, means for flexing the chain edgewise while maintaining it transversely horizontal and for guiding the transversely horizontal chain from the forward end of one longitudinal trough to the rearward end of the lateral trough and from the forward end of the lateral trough to the rearward end of the other longitudinal trough, other means for flexing the chain edgewise while maintaining it transversely horizontal and for guiding the transversely horizontal chain from the forward end of the last said longitudinal trough to the rearward end of the other longitudinal trough, means for applying power to the chain to drive it in the forward direction, and means for supplying feed to be moved by the chain along the said troughs.

18. In a poultry feeding apparatus, the combination of two parallel longitudinally extending and laterally spaced horizontal feeding troughs having flat bottoms, an endless openwork articulated chain comprising transversely extending generally horizontal interengaging wires which chain has a width substantially greater than its thickness and has interstices between the wires for receiving and moving feed, the said chain being freely flexible edgewise and having portions extending through and supported by the troughs, means for flexing the chain edgewise while maintaining it transversely horizontal and for guiding the transversely horizontal chain in a lateral path from the forward end of one longitudinal trough to the rearward end of the other longitudinal trough, means below the said lateral path of movement of the chain for retaining feed in engagement therewith, other means for flexing the chain edgewise while maintaining it transversely horizontal and for guiding the transversely horizontal chain in a second lateral path from the forward end of the last said longitudinal trough to the rearward end of the other longitudinal trough, means for applying power to the chain in the second said lateral path to drive the said chain in the forward direction, and means adjacent the second said lateral path for supplying feed to be moved by the chain along the said troughs.

19. In a poultry feeding apparatus, the combination of two longitudinally extending and laterally spaced horizontal feeding troughs having flat bottoms, an endless openwork articulated chain comprising transversely extending generally horizontal interlaced wires which chain has a width substantially greater than its thickness and has interstices between the wires for receiving and moving feed, the said chain being freely flexible edgewise and having portions extending through and supported by the troughs, means including corner units adjacent the ends of the troughs for flexing the chain edgewise while maintaining it transversely horizonal and for guiding the transversely horizontal chain in lateral paths from the forward end of each trough to the rearward end of each other trough, each corner unit comprising a guide wheel rotatable about a vertical axis and engaging one edge of the chain, means for applying power to the chain to drive it in the forward direction, and means for supplying feed to be moved by the chain along the said troughs and along the last said lateral path.

20. A poultry feeding apparatus as set forth in claim 19, wherein each corner unit includes a horizontal plate adjacent the wheel and below the chain for preventing the chain from tilting downwardly below a transversely horizontal position, and wherein each corner unit also includes at least one auxiliary guide wheel engaging the upper face of the chain for preventing the chain from tilting upwardly above a transversely horizontal position.

21. A poultry feeding apparatus as set forth in claim 19, wherein each corner unit includes a main horizontal supporting plate on which the rotatable guide wheel is mounted, and wherein each corner unit includes vertical plates adjacent the edges of the chain and cooperating with the guide wheel to retain feed in engagement with the chain.

22. A poultry feeding apparatus as set forth in claim 21, wherein each corner unit also includes a cover plate engaging the top edges of the said vertical plates and serving to prevent poultry from having access to the moving parts of the corner unit.

23. In a poultry feeding apparatus, the combination of a longitudinally extending horizontal feeding trough having a flat bottom, a feed hopper having separate forward and rearward feed containing chambers and including a lower channel for receiving feed from the said chambers, the said hopper channel having a flat bottom and having the same width as the said trough, an endless openwork articulated chain comprising transversely extending generally horizontal interlaced wires which chain has a width substantially greater than its thickness and has interstices between the wires for receiving and moving feed, the said chain being freely flexible and having portions extending through and supported by the trough and the hopper channel, means for flexing the chain and for guiding it from the forward end of the trough to the rearward end of the hopper channel and from the forward end of the hopper channel to the rearward end of the trough, means for applying power to the chain to drive it in the forward direction, a gate at the forward side of the rearward hopper chamber and within the hopper channel for limiting the depth of the layer of feed supplied to the moving chain from said rearward chamber, and a second gate at the forward side of the forward hopper chamber and within the hopper channel for limiting the depth of additional feed supplied from the rearward chamber and superposed on the layer of feed from the forward chamber.

24. In a poultry feeding apparatus, the combination of a longitudinally extending horizontal feeding trough having a flat bottom, a feed hopper including a lower channel for receiving feed from the said chambers, the said hopper channel having a flat bottom and having the same width as the said trough, an endless openwork articulated chain comprising transversely extending generally horizontal interlaced wires which chain has a width substantially greater than its thickness and has interstices between the wires for receiving and moving feed, the said chain being freely flexible and having portions extending through and supported by the trough and the hopper channel, means for flexing the chain and for guiding it from the forward end of the trough to the rearward end of the hopper channel and from the forward end of the hopper channel to the rearward end of the trough, means for applying power to the chain to drive it in the forward direction, and a feed agitator in the hopper comprising a rotatable longitudinal shaft, two longitudinally spaced discs on the shaft, and a plurality of longitudinal wires connected with the discs near the peripheries thereof.

PHILIP B. ROBERTS.
THOMAS B. BUTTON.

REFERENCES CITED

The following references are of record in the file of this patent:

UNITED STATES PATENTS

| Number | Name | Date |
|---|---|---|
| 756,600 | Dodge | Apr. 5, 1904 |
| 1,427,553 | Schwinger | Aug. 29, 1922 |
| 1,805,430 | Rowe | May 12, 1931 |
| 1,977,513 | Holbeck | Oct. 16, 1934 |
| 2,155,874 | Sinden | Apr. 25, 1939 |
| 2,513,706 | Baehr | July 4, 1950 |
| 2,522,449 | Inman | Sept. 12, 1950 |

OTHER REFERENCES

Sprague et al. Progress Report No. 2, Sept. 1948, Automatic Poultry Feeder Plan, Pennsylvania State College School of Agriculture, Agricultural Experiment Station, State College, Pennsylvania.